US011044174B2

(12) United States Patent
Chaudhary et al.

(10) Patent No.: US 11,044,174 B2
(45) Date of Patent: Jun. 22, 2021

(54) SYSTEMS AND METHODS FOR DISABLING SERVICES IN A CLUSTER

(71) Applicant: Citrix Systems, Inc., Fort Lauderdale, FL (US)

(72) Inventors: Aman Chaudhary, Bengaluru (IN); Vemula Srimithra, Bengaluru (IN); Raghav S N, Bengaluru (IN); Rajesh Joshi, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/599,153

(22) Filed: Oct. 11, 2019

(65) Prior Publication Data

US 2021/0067424 A1 Mar. 4, 2021

Related U.S. Application Data

(60) Provisional application No. 62/891,713, filed on Aug. 26, 2019.

(51) Int. Cl.
*H04L 12/24* (2006.01)
*H04L 29/08* (2006.01)

(52) U.S. Cl.
CPC ...... *H04L 41/5054* (2013.01); *H04L 41/0893* (2013.01); *H04L 41/12* (2013.01);
(Continued)

(58) Field of Classification Search
CPC ......... H04L 41/08; H04L 41/12; H04L 41/22; H04L 41/0806; H04L 41/0893;
(Continued)

(56) References Cited

U.S. PATENT DOCUMENTS 5,774,668 A * 6/1998 Choquier ............... G06F 9/505
370/480
7,203,944 B1 * 4/2007 van Rietschote ... G06F 9/45533
718/1
(Continued)

FOREIGN PATENT DOCUMENTS

EP 2 442 226 A1 4/2012
WO WO-2018/125686 A2 7/2018

OTHER PUBLICATIONS

International Search Report and Written Opinion on International App. No. PCT/US2020/044048, dated Oct. 22, 2020.
(Continued)

*Primary Examiner* — Kostas J Katsikis
(74) *Attorney, Agent, or Firm* — Foley & Lardner LLP

(57) ABSTRACT

Disclosed herein includes a system, a method, and a device for disabling services in a cluster. A master node of a plurality of nodes of a cluster can receive a disable instruction for a service of the cluster. The master node can transmit to the plurality of nodes a transition instruction to instruct the other nodes to stop accepting requests from one or more client devices for the service. The master node can receive, from each of the plurality of nodes, a client count value indicative of a number of current client connections from the one or more client devices to one or more respective nodes of the plurality of nodes. The master node can determine that the client count value is a zero value for each node of the plurality of nodes. The master node can transmit an out of service instruction to each node of the plurality of nodes to disable the service on the cluster.

18 Claims, 9 Drawing Sheets

(52) U.S. Cl.
CPC ...... *H04L 67/1029* (2013.01); *H04L 67/1034* (2013.01); *H04L 67/143* (2013.01); *H04L 67/34* (2013.01); *H04L 67/36* (2013.01)

(58) Field of Classification Search
CPC . H04L 41/0654; H04L 41/5054; H04L 45/02; H04L 67/34; H04L 67/36; H04L 67/143; H04L 67/1008; H04L 67/1029; H04L 67/1034; H04L 67/1048; H04L 67/2861; H04L 69/40; G06F 9/445; G06F 9/4416; G06F 11/16; G06F 11/202; G06F 11/3433; G06F 16/20
See application file for complete search history.

(56) References Cited

U.S. PATENT DOCUMENTS

| | | | | |
|---|---|---|---|---|
| 8,296,419 | B1* | 10/2012 | Khanna | H04L 67/1029 709/224 |
| 8,819,106 | B1* | 8/2014 | Sirota | G06F 9/485 709/201 |
| 9,026,630 | B2* | 5/2015 | Gulati | G06F 9/5044 709/223 |
| 9,374,293 | B2* | 6/2016 | Chai | H04L 45/12 |
| 2010/0162036 | A1* | 6/2010 | Linden | G06F 11/181 714/4.11 |
| 2010/0325391 | A1 | 12/2010 | Talla | |
| 2011/0022812 | A1* | 1/2011 | van der Linden | H04L 67/1097 711/163 |
| 2011/0173490 | A1* | 7/2011 | Narayanaswamy | H04L 63/1408 714/4.11 |
| 2014/0016650 | A1* | 1/2014 | Chai | H04L 45/02 370/431 |
| 2014/0172944 | A1 | 6/2014 | Newton et al. | |
| 2014/0304352 | A1* | 10/2014 | Chaudhary | H04L 67/1002 709/208 |
| 2014/0337472 | A1* | 11/2014 | Newton | H04L 41/509 709/217 |
| 2015/0215379 | A1* | 7/2015 | Tamano | G06F 9/50 709/201 |
| 2016/0019253 | A1* | 1/2016 | Chan | G06F 16/2343 707/704 |
| 2018/0157560 | A1* | 6/2018 | Gochkov | G06F 11/2048 |
| 2018/0249432 | A1* | 8/2018 | Kurian | H04W 8/005 |
| 2019/0229900 | A1 | 7/2019 | Khristi et al. | |
| 2020/0036790 | A1* | 1/2020 | Lv | H04L 67/1097 |
| 2020/0042298 | A1* | 2/2020 | Jain | G06F 11/1433 |

OTHER PUBLICATIONS

Xiangyang Jia et al: "Scheduling Active Services in Clustered JBI Environment", Dec. 1, 2009 (Dec. 1, 2009), Cloud Computing, Springer Berlin Heidelberg, Berlin, Heidelberg, p. 413-422, XP019135549, ISBN: 978-3-642-10664-4.

* cited by examiner

SYSTEMS AND METHODS FOR DISABLING SERVICES IN A CLUSTER

CROSS-REFERENCE TO RELATED APPLICATIONS

The present applications claims priority to and the benefit of U.S. Provisional Application No. 62/891,713, titled "SYSTEMS AND METHODS FOR DISABLING SERVICES IN A CLUSTER", and filed on Aug. 26, 2019, the entire contents of which are hereby incorporated by reference in entirety.

FIELD OF DISCLOSURE

The present disclosure is generally related to display systems and methods, including but not limited to systems and methods for disabling one or more services provided in a cluster.

BACKGROUND

Network devices can be connected or grouped together through multiple virtual wide area networks (WAN) or other networks together to form a cluster. The network devices can work together within the cluster to provide improved processing speed, storage capacity, and an increased availability of resources.

SUMMARY

Devices, systems and methods for disabling services in a cluster are provided herein. In embodiments, a master node of a plurality of nodes in a cluster can determine when the number of active or current client connections to each node of the cluster have ended such that there are no active client connections across all nodes in the cluster for the service and disable or transition the service out of service responsive to determination.

The cluster can include a plurality of nodes, one node can be selected as a master node for a given service. The remaining nodes can be notified or otherwise aware of which node is the master node, for example, using consistent hashing. Each node can include at least one master packet engine and a plurality of cores. The master packet engine executing on each node can determine a current client connection value indicating a number of active connections across each core of the respective node. The master packet engine executing on each node can provide the current client connection value (e.g., client count value) to the master node. The master node can use the client count values received from each of the nodes to determine an active connection count for the cluster. If the active connection count for the cluster is a zero value, the master node can transition the service to out of service. If the active connection count for the cluster is a non-zero value, the master node can wait for subsequent updates from one or more of the nodes having active connections to transition the service to out of service. For example, to reduce traffic and communication between nodes, the master packet engine at each of the non-master nodes can communicate to the master node when the nodes respective client count value changes from a non-zero value to a zero value or from a zero value to a non-zero value. The master node can wait until the active connection count for the cluster is a zero value, the master node can transition the service to out of service.

An administrator can perform maintenance or an upgrade to an application or a service, by taking the respective application or service out of service. However, if the application or service is closed or disable with active client connections, current users of the application or service will immediately lose access to the application or service. In a single application or service environment, a device (e.g., intermediary device) can be aware of the number of active client connections at any time. However, in a cluster, multiple applications (e.g., nodes) can be executing at the same time and each of the applications can include one or more cores with one or more active client connections. The systems, methods and devices described herein can disable a service in a cluster without negatively impacting current client connections and responsive to determine that the client connection value for the cluster and across each node of the cluster is a zero value.

In at least one aspect, a method for disabling services in a cluster is provided. The method can include receiving, by a master node of a plurality of nodes of a cluster, a disable instruction for a service of the cluster. Each node can include a plurality of cores to provide one or more connections to one or more client devices using the service. The method can include transmitting, by the master node to other nodes of the plurality of nodes, a transition instruction to instruct the other nodes to stop accepting requests from the one or more client devices for the service. The method can include, responsive to determining that there are no current client connections from the one or more client devices one or more respective nodes of the plurality of nodes, transmitting, by the master node, an out of service instruction to each node of the plurality of nodes to disable the service on the cluster.

In some embodiments, the method can include receiving, by the master node from each of the other nodes of the plurality of nodes, a client count value indicative of a number of current client connections from the one or more client devices to one or more respective nodes of the plurality of nodes. The method can include determining, by the master node, that the client count value is a zero value for each node of the plurality of nodes.

In some embodiments, the method can include generating, by the master node, the transition instruction for each node of the plurality of nodes to transition a status the service from active to transition at the plurality of nodes. The method can include generating, by the master node, a first mapping having a bit value for each node of the plurality of nodes. The bit value can indicate if the respective node provided the client count value to the master node. The method can include updating, by the master node, one or more bit values in the first mapping to indicate that one or more nodes of the plurality of nodes provided respective count values. The method can include resetting, by the master node, the bit value in the first mapping for each node responsive to transmitting the out of service instruction to the plurality of nodes.

In some embodiments, the method can include generating, by the master node, a second mapping having a bit value for each node of the plurality of nodes. The bit value can indicate if the client count value for the respective node has a non-zero value or a zero value. The method can include updating, by the master node, one or more bit values in the second mapping to indicate a non-zero value or a zero value for the client count value for the one or more nodes of the plurality of nodes that provided respective count values. The method can include resetting, by the master node, the bit value in the second mapping for each node responsive to transmitting the out of service instruction to the plurality of nodes.

In some embodiments, the method can include determining, by a master packet engine for each node, the client count value indicating a number of active connections to one or more clients from the node. The method can include transmitting, by the master packet engine for each node, the client count value to the master node responsive to the transition instruction. The method can include determining, by a master packet engine for one or more nodes of the plurality of nodes, the client count value for the respective node changed from a non-zero value to the zero value or from the zero value to the non-zero value. The method can include transmitting, by the master packet engine for the one or more nodes, a subsequent client count value to the master node responsive to the change in the client count value.

In at least one aspect, a system for disabling services in a cluster is provided. The system can include a master node of a plurality of nodes of a cluster. The master node can include one or more processors. The one or more processors can be configured to receive a disable instruction for a service of the cluster. Each node can include a plurality of cores to provide one or more connections to one or more client devices using the service. The one or more processors can be configured to transmit a transition instruction to instruct the other nodes to stop accepting requests from the one or more client devices for the service. The one or more processors can be configured to, responsive to determining that there are no current client connections from the one or more client devices one or more respective nodes of the plurality of nodes, transmit an out of service instruction to each node of the plurality of nodes to disable the service on the cluster.

In some embodiments, the one or more processors can be configured to receive, from each of the other nodes of the plurality of nodes, a client count value indicative of a number of current client connections from the one or more client devices to one or more respective nodes of the plurality of nodes. The one or more processors can be configured to determine that the client count value is a zero value for each node of the plurality of nodes.

In some embodiments, the one or more processors can be configured to generate the transition instruction for each node of the plurality of nodes to transition a status the service from active to transition at the plurality of nodes. The one or more processors can be configured to generate a first mapping having a bit value for each node of the plurality of nodes, the bit value indicating if the respective node provided the client count value to the master node. The one or more processors can be configured to update one or more bit values in the first mapping to indicate that one or more nodes of the plurality of nodes provided respective count values. The one or more processors can be configured to reset the bit value in the first mapping for each node responsive to transmitting the out of service instruction to the plurality of nodes.

In some embodiments, the one or more processors can be configured to generate a second mapping having a bit value for each node of the plurality of nodes, the bit value indicating if the client count value for the respective node has a non-zero value or a zero value. The one or more processors can be configured to update one or more bit values in the second mapping to indicate a non-zero value or a zero value for the client count value for the one or more nodes of the plurality of nodes that provided respective count values. The one or more processors can be configured to reset the bit value in the second mapping for each node responsive to transmitting the out of service instruction to the plurality of nodes.

In at least one aspect, a non-transitory computer readable medium storing instructions is provided. The instructions when executed by one or more processors can cause the one or more processors to receive a disable instruction for a service of the cluster. Each node can include a plurality of cores to provide one or more connections to one or more client devices using the service. The instructions when executed by one or more processors can cause the one or more processors to transmit a transition instruction to instruct the other nodes to stop accepting requests from the one or more client devices for the service. The instructions when executed by one or more processors can cause the one or more processors to receive, from each of the other nodes of the plurality of nodes, a client count value indicative of a number of current client connections from the one or more client devices to one or more respective nodes of the plurality of nodes. The instructions when executed by one or more processors can cause the one or more processors to determine that the client count value is a zero value for each node of the plurality of nodes. The instructions when executed by one or more processors can cause the one or more processors to transmit an out of service instruction to each node of the plurality of nodes to disable the service on the cluster.

In some embodiments, the instructions when executed by one or more processors can cause the one or more processors to generate a first mapping having a bit value for each node of the plurality of nodes, the bit value indicating if the respective node provided the client count value to the master node. The instructions when executed by one or more processors can cause the one or more processors to generate a second mapping having a bit value for each node of the plurality of nodes, the bit value indicating if the client count value for the respective node has a non-zero value or a zero value.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes a network environment and computing environment which may be useful for practicing embodiments described herein.

Section B describes embodiments of systems and methods for delivering a computing environment to a remote user.

Section C describes embodiments of systems and methods for virtualizing an application delivery controller.

Section D describes embodiments of devices, systems and methods for disabling services in a cluster.

A. Network and Computing Environment

Figure 1A:
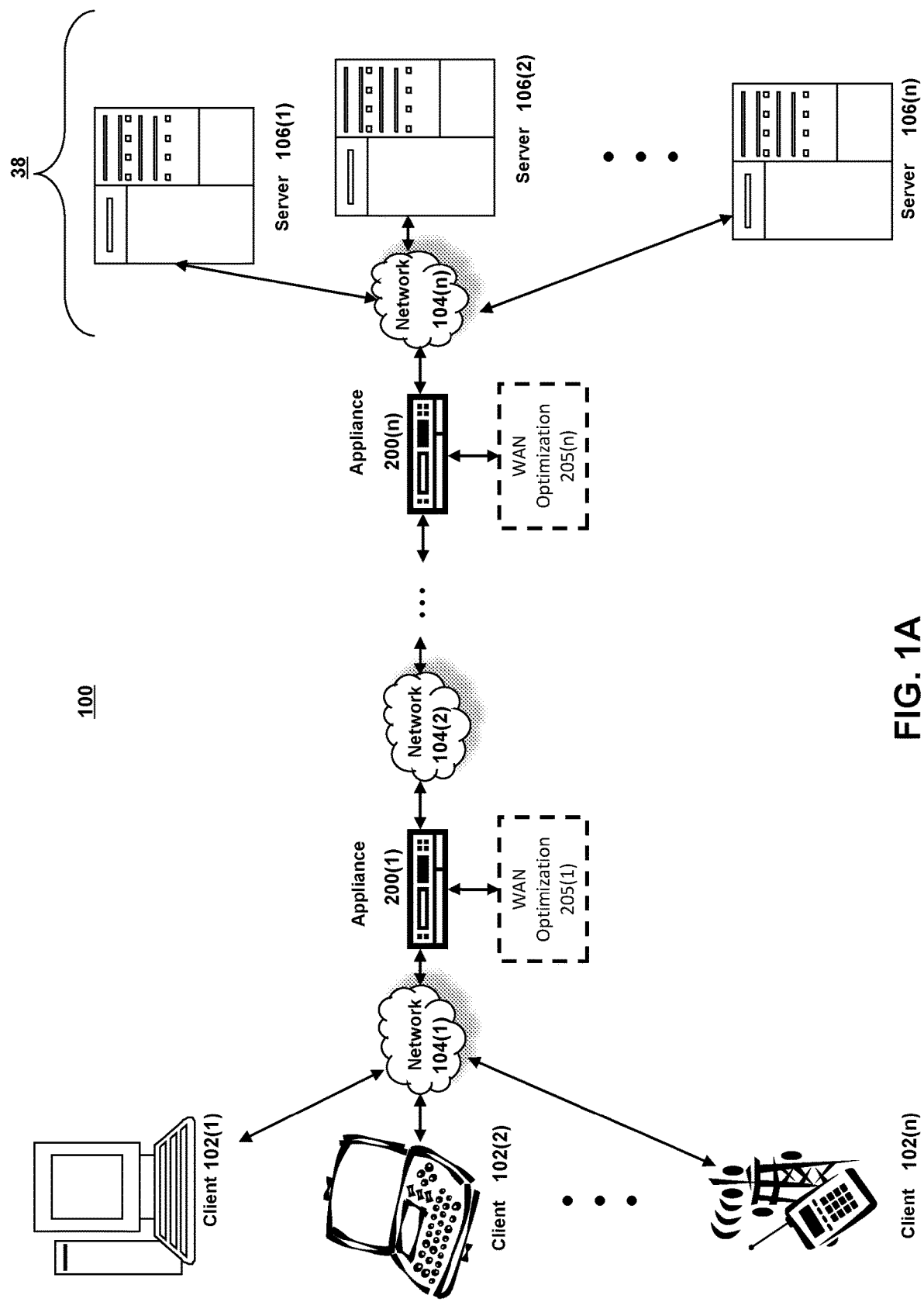
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
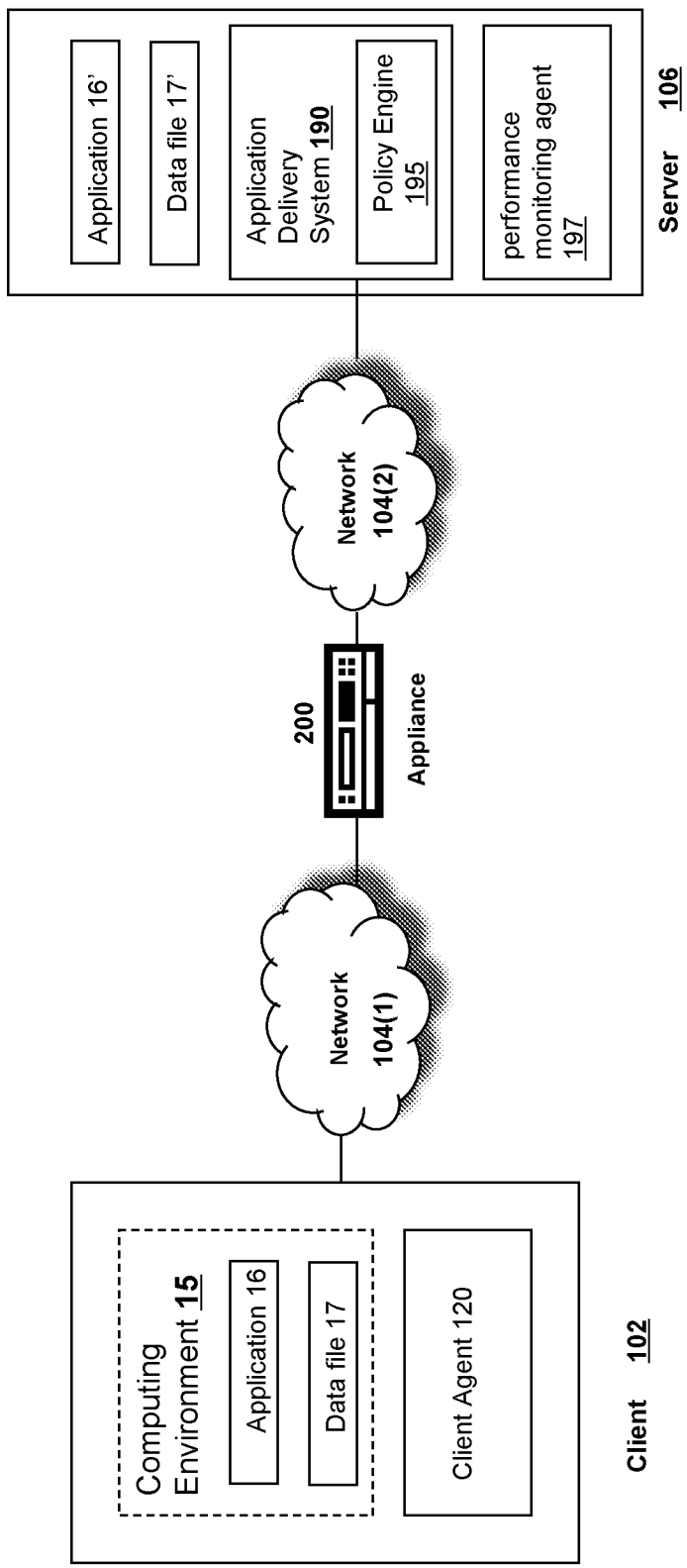
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
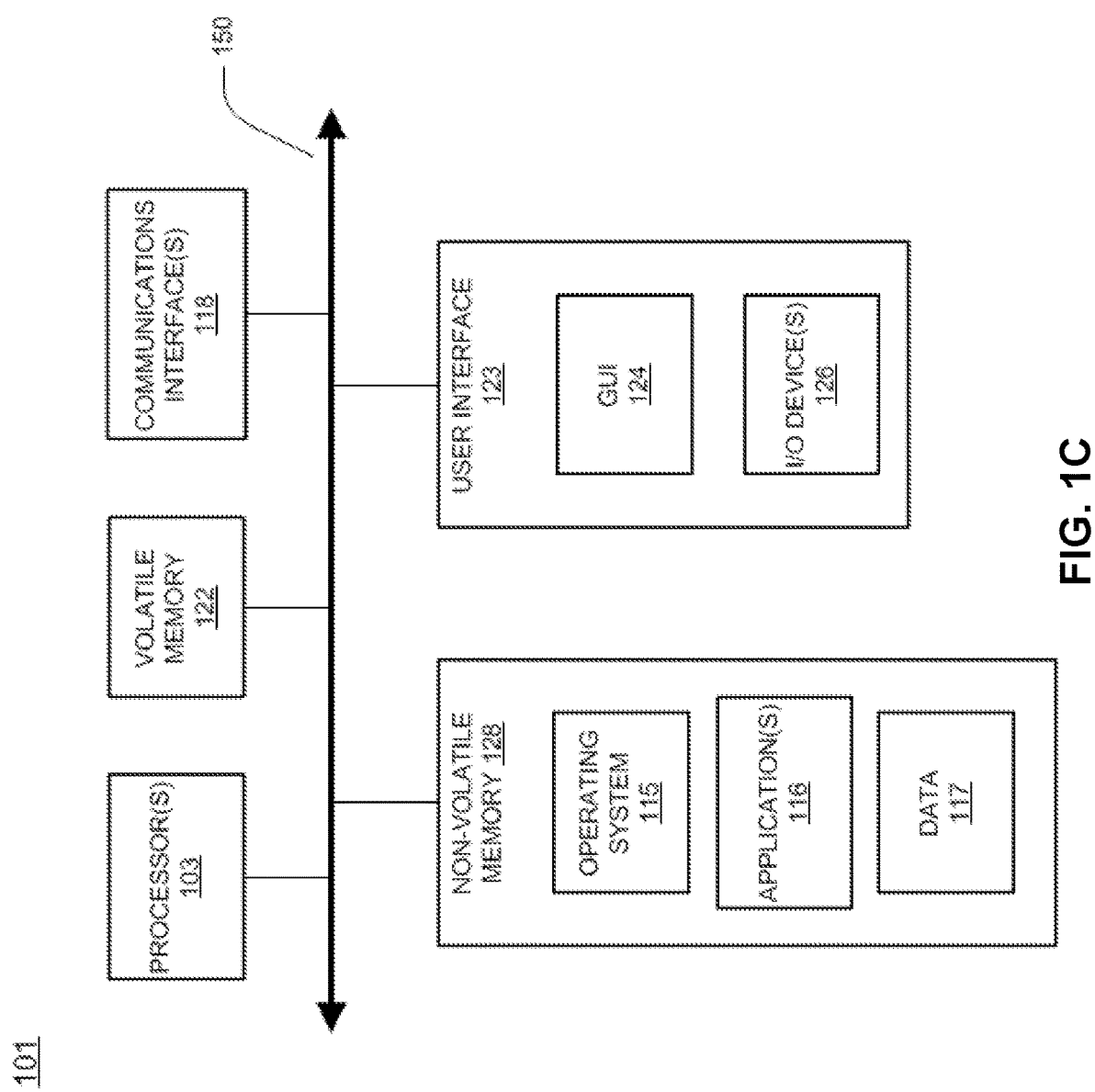
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s)

126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
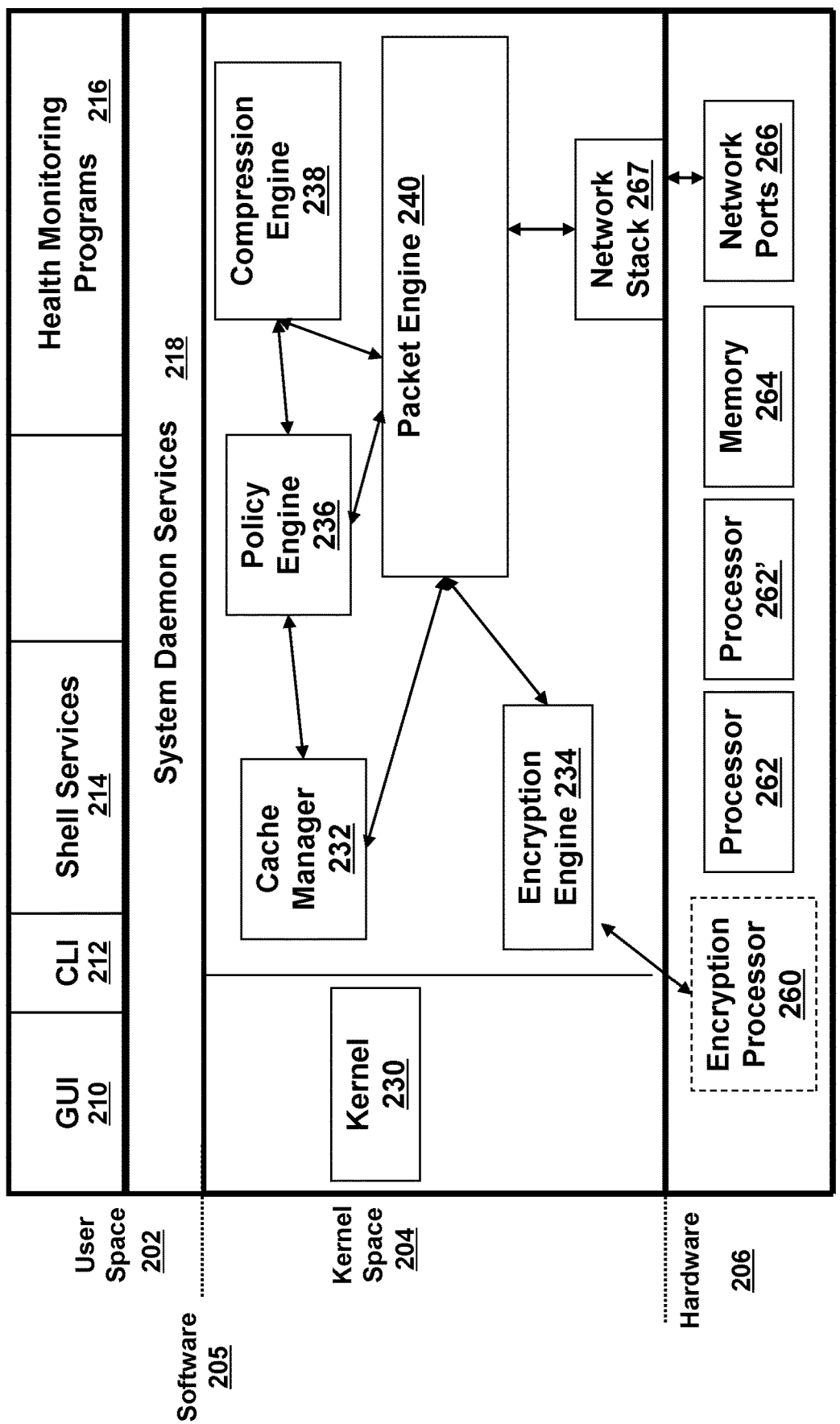
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
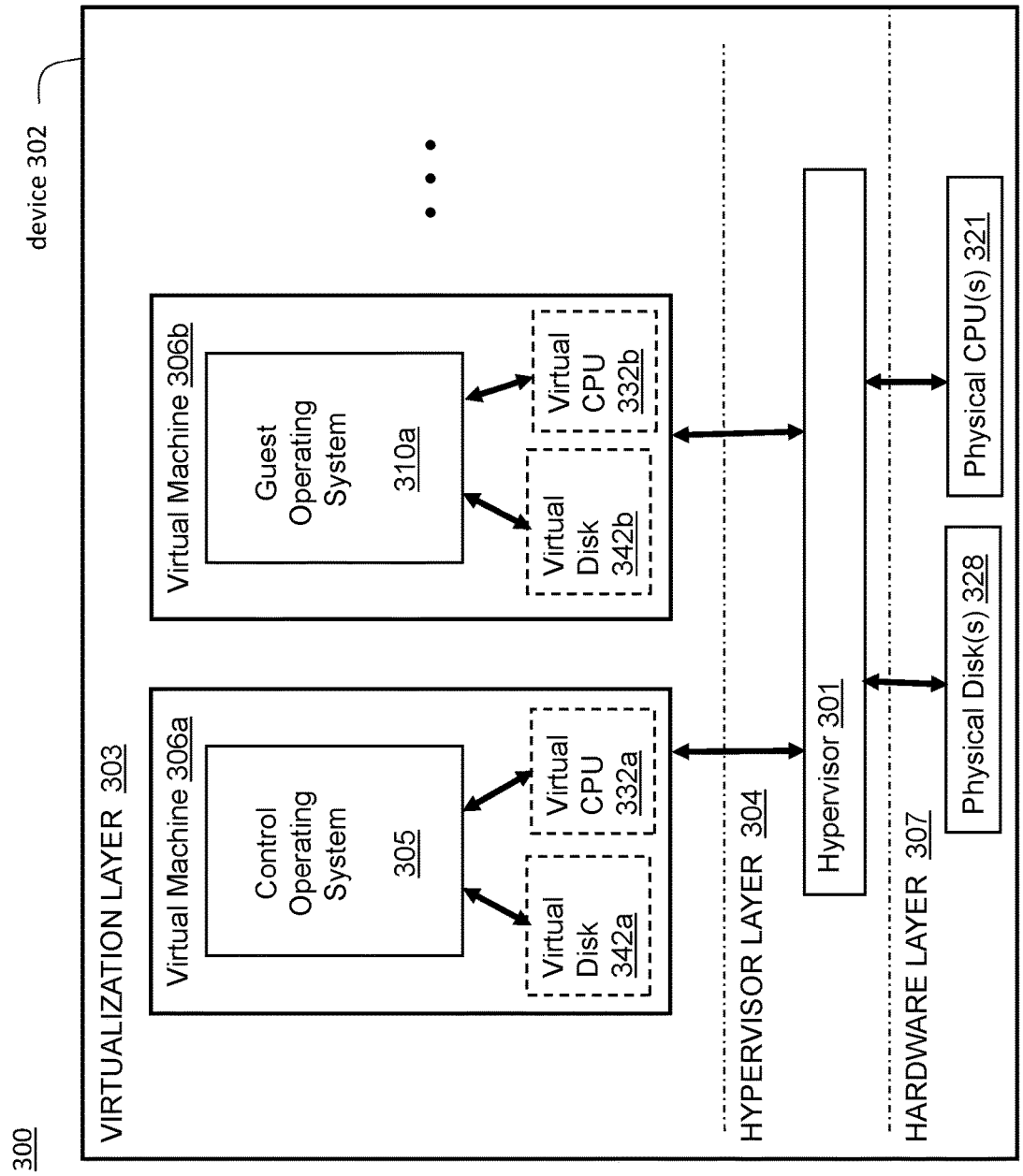
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. A plurality of appliances 200 or other computing devices (e.g., nodes) may be joined into a single cluster. A cluster may operate as an application server, network storage server, backup service, or any other type of computing device to perform many of the functions of appliances 200 and/or 205.

D. Disabling Services in a Cluster

Devices, systems and methods for disabling services in a cluster are provided herein. The cluster can include a plurality of nodes (e.g., applications) and each of the nodes can have one or more cores executing thereon. The cluster can provide one or more services that client devices can access through connections to the cores on the nodes. One of the nodes in the cluster can be selected or assigned as a master node for the cluster and each of the nodes can include at least one master packet engine to communicate with the master node.

The services can be disabled or taken out of service at various times to, for example, perform maintenance or an upgrade to the respective service. For example, to perform maintenance or an upgrade to a service, a disable service instruction can issued to the cluster, for example, by an administrator. The master node can determine when the client count value (e.g., number of active client connections) for the service is a zero value on each node and take the respective service out of service. In embodiments, when a disable service instruction is issued, the master node can change or move a status of the service from "active" to "transition" (e.g., transition out of service (TROFS), moving out of service). The master node can issue, transmit or propagate a transition instruction (e.g., TROFS command)

to each of the nodes in the cluster. In the transition state, the nodes and cores will stop accepting or taking traffic from new clients for the service. The service can be left or maintained in the transition status until all active connections at each of nodes are terminated or completed and then the service can be moved to an "out of service" status or state.

The master node can determine the client count value for each node through communication with the master packet engine at each node. For example, when the master packet engine on each nodes receives the transition instruction for a first or initial time (or responsive to a change in a master node), the master packet engine can determine the client count value for the respective node indicative of the number of active client connections for the service. The master packet engine can transmit the client count value to the master node indicating a non-zero value for one or more active client connections or a zero value for no active client connections. The master packet engine can store the client count value transmitted to the master node. The master packet engine can wait to transmit a next or subsequent client count value to the master node until the client count value changes from a non-zero value to a zero value or from a zero value to a non-zero value. Thus, the number of communications between the nodes or between the master packet engines and the master node, can be reduced or limited to specific circumstances. The master node can determine the number of active client connections for the cluster using the client count values from each node. If the number of active connections is a zero value, the master node can issue a disable instruction and the service can be disabled or moved out of service at each of the nodes. If the number of active connections is a non-zero value, the master node can wait until the number of active connections is a zero value and issue the disable instruction responsive to zero value for the number of active connections and the service can be disabled or moved out of service at each of the nodes.

Thus, the devices, methods and systems described herein can provide connection count synchronization across a cluster (e.g., across each node of a cluster) with reduced or minimal node to node communication overhead and reduce a memory requirement for the cluster. The distributed service ownership model and the reduced or low memory requirement can allow for the methods and systems to be scaled for an increased number of services and cluster nodes in the respective cluster. For example, the same memory allocation used with the devices, methods and systems described herein can be scaled to increase the number of nodes of the cluster and/or the services provided by the cluster. In embodiments, the systems and methods can be state less to provide a highly robust system that is resilient to cluster issues or dynamism, such as but not limited to, node failure, node upgrades, or communication failures between nodes and providing the nodes the capability to recover independently or individually. In some embodiments, the devices, methods and systems described herein can provide that for a given service, each node of the cluster make a state change to "out of service" at the same time.

Many customers can have high capacity requirements, therefore application delivery systems can be deployed in a cluster or cluster mode. To perform maintenance or upgrades of the services (e.g., services software) without impacting existing clients or clients with active connections, a graceful shutdown or disabling of a respective services is needed. The devices, systems and methods described herein can provide graceful shutdown of services by disabling the respective services when the number of active connections is a zero value and through reduced or minimal node to node communication. The reduced memory requirement can provide scaling solutions or auto scaling solutions to the cluster such that new features or upgrades to services can be performed or rolled out seamlessly and without negatively impacting the client experience. For example, customers may use or be moving towards auto scaling features to scale up or scale down their services when needed and customers deploying proxies in a cluster topology to achieve a higher or increased throughput. The devices, systems and methods described herein can reduce or minimize client interruptions as application or service upgrades and maintenance can be performed without interrupting active client traffic.

Figure 4:
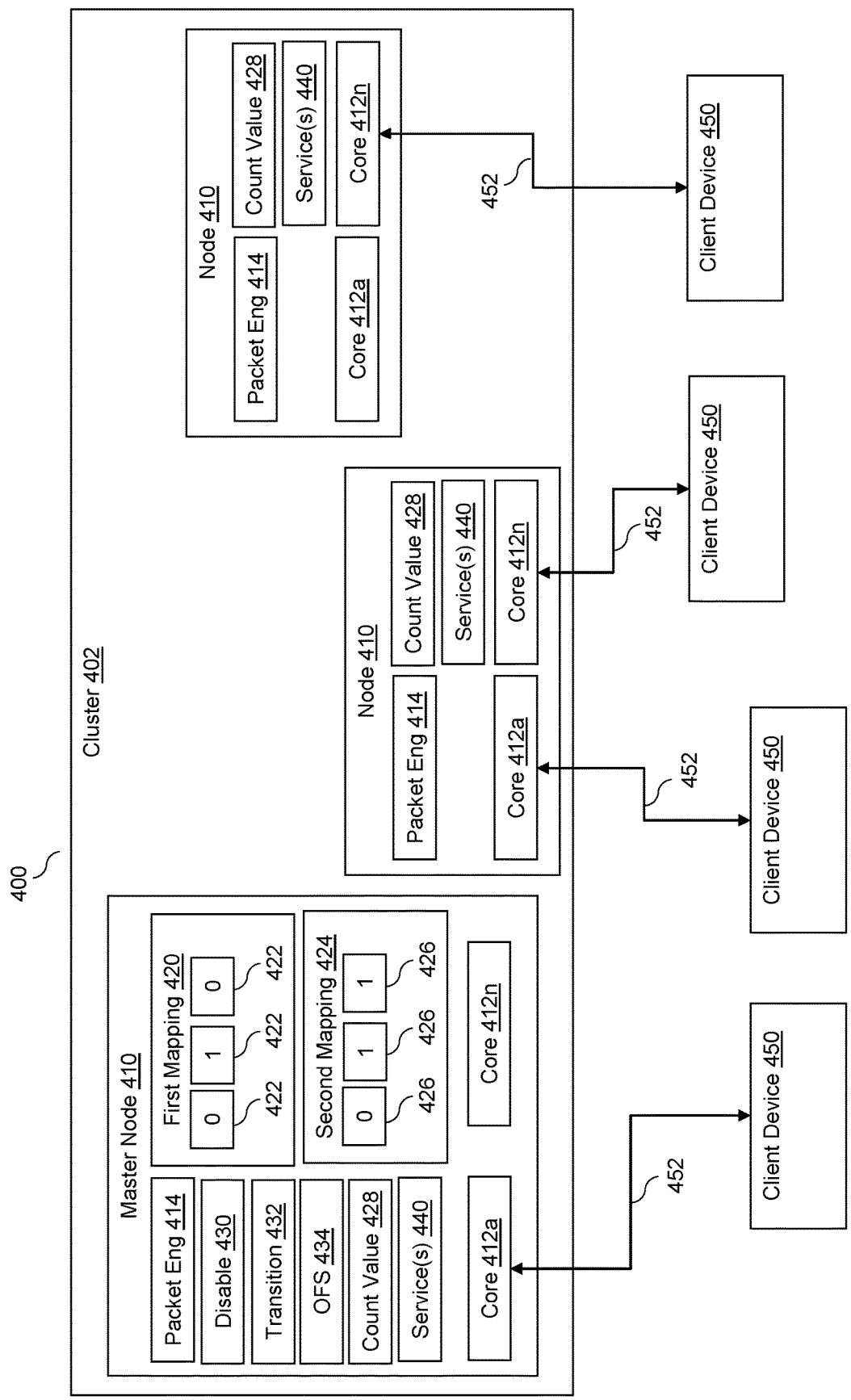
FIG. 4 is a block diagram of an embodiment of a system for disabling services in a cluster, according to an example implementation of the present disclosure.

Referring now to FIG. 4, an example system 400 for disabling services in a cluster is provided. In brief overview, the system 400 can include a cluster 402 having a plurality of nodes 410 to provide one or more services 440 to one or more client devices 450. Cluster 402 can include or be formed from a plurality of connected or distributed computing devices or appliances (e.g., hardware appliances, virtual appliances). In embodiments, the cluster 402 can include a group or plurality of appliances working together as a single system image. The appliances can include single of multi-core appliances. Each of the individual computing devices or appliances can be referred to or correspond to at least one node 410 of the cluster 402. The cluster 402 can include a single node 410 or a plurality of nodes 410. The cluster 402 can include or provide a centralized management system to perform load balancing, distribution, configuration, or other tasks to allow the nodes 410 to operate in conjunction as a single computing system. In embodiments, the cluster 402 may be viewed as a single virtual appliance or computing device. In embodiments, a plurality of appliances 200 or other computing devices (e.g., nodes) may be joined into a single cluster 402. The cluster 402 can operate as an appliance cluster, application server, network storage server, backup service, or any other type of computing device.

In embodiments, the cluster 402 can include multiple nodes 410 that may be physically grouped, such as a plurality of blade servers in a chassis or plurality of rack mount devices in a single rack, but in other embodiments, the cluster 402 may be distributed in a plurality of chassis, plurality of racks, plurality of rooms in a data center, plurality of data centers, or any other physical arrangement. Accordingly, the cluster 402 may be considered a virtual cluster, grouped via common configuration, management, and purpose, rather than a physical group. A node 410 can include or correspond to an appliance, such as but not limited to, appliance 200 described above with respect to FIGS. 1A-3.

Each of the nodes 410 can include a single core 412 or a plurality of cores 412. The cores 412 can include or correspond to any of the cores described herein. The core 412 can include or correspond to a processor to receive or transmit instructions (e.g., from a master node, from a master packet engine) and perform actions, functions or calculations based on the instructions. Each of the cores 412 can include a single packet engine 414 or multiple packet engines 414. The packet engine 414 (e.g., packet processing engine) can be responsible for managing the kernel-level processing of packets received and transmitted by a node 410 and/or core 412. For example, the packet engine 414 can be the same as any form of packet engine described herein, including packet engine 240 described above with respect to FIG. 2.

Each node 410 can assign, select or designate at least one packet engine 414 as a master packet engine 414 for the respective node 410.

The nodes 410 can include one or more processors 204 such as but not limited to processor(s) 103 described above with respect to FIG. 1C and/or processors 260, 262, 262' described above with respect to FIG. 2. The nodes 410 can include one or more storage devices (e.g., memory). For example, the nodes 410 can include a storage device or memory coupled with one or more processors. The storage devices can be the same as or similar to memory 122, 128 described above with respect to FIG. 1C and/or memory 264 described above with respect to FIG. 2. The memory can include a static random access memory (SRAM) as an example.

The services 440 can include or correspond to an application service. The services 440 can include an application, program, library, script, process, task or any type and form of executable instructions to perform or provide at least part of the functionality of an application. In some embodiments, the services 440 can include one or more microservices. A service 440 can include any form of a service as described herein, including but not limited to, services correspond to or associated with real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

Each of the nodes 410 can include or generate a client count value 428. The client count value 428 can indicate or identify a number of active connections 452 between one or more cores 412 of the node 410, the node 410 and one or more client devices 450. The client count value 428 can indicate or represent the number of connections 452 for a particular service 440. In some embodiments, the count value 428 can indicate or represent the total number of connections 452 (e.g., one or more services 440) from a node 110 to a client device 450. The client count value 428 can indicate or identify the number of connections 452 receiving and/or providing communication or traffic between a core 412, the node 410 and a client device 450. The master packet engine 414 of each node 410 can determine the client count value 428 for the respective node 410.

The master node 410 can generate a first mapping 420 having one or more bit values 422. The first mapping 420 can include or correspond to a bit map, file, table database, or data structure to store values indicating if a node 410 responded with a client count value 428. For example, the first mapping 420 can include at least one entry for each node 410 in the cluster 402. Each entry can include at least one bit value 422 to map a node 410 to at least one bit value 422. The bit values 422 can indicate if the corresponding node 410 has responded with a client count value 428 or if the master node 410 is still waiting on a response from the corresponding node 410. In some embodiments, a first bit value 422 can include a zero value (e.g., 0) that indicates the corresponding node 410 has not responded with or provided a client count value 428 and a second bit value 422 can include a non-zero value (e.g., 1) that indicates the corresponding node 410 has responded with or provided a client count value 428. The master node 410 can maintain and store the first mapping 420 in a storage device or database of the master node 410 or of the cluster 402.

The master node 410 can generate a second mapping 424 having one or more bit values 426. The second mapping 424 can include or correspond to a bit map, file, table database, or data structure to store values indicating if the client count value 428 for a node 410 is a zero value or a non-zero value. For example, the second mapping 424 can include at least one entry mapping a client count value 428 for each node 410 in the cluster 402. Each entry can include at least one bit value 426 to indicate if the client count value 428 for a node is a zero value (e.g., 0) indicating that the corresponding node 410 has no active connections 452 and a non-zero value (e.g., 1) indicating that the corresponding node 410 has one or more active connections 452. In some embodiments, a first bit value 426 can correspond to a zero value (e.g., 0) and zero active connections 452 at the corresponding node 410 and a second bit value 426 can correspond to a non-zero value (e.g., 1) indicating one or more active connections 452 at the corresponding node 410.

The master node 410 or the cluster 402 can receive a disable instruction 430. The disable instruction can include a command, instruction, script, task or any type and form of executable instructions to indicate to the master node 410 and/or cluster 402 to disable a service 440 or move a service 440 out of service 440. For example, the disable instruction 430 can identify a service 440 to be disabled. In some embodiments, the disable instruction 430 can be generated by an administrator or responsive to an input from an administrator of the cluster 402. In some embodiments, the disable instruction 430 can be issued at predetermined intervals or regular intervals, for example, according to a maintenance plan for one or more services 440.

The master node 410 can generate transition instruction 432. The transition instruction 432 can include or correspond to a transition out of service (TROFS) command. The transition instruction 432 can include a command, instruction, script, task or any type and form of executable instructions to cause a node 410 to stop accepting traffic or connections 452 for a service 440. The transition instruction 432 can identify a service 440 and include a time stamp or time period. The master node 410 can transmit or propagate the transition instruction 432 to each node 410 of the cluster 402 to cause the nodes 410 to stop accepting traffic or connections 452 for the identified service 440, for example, from one or more client devices 450. In some embodiments, the master packet engine 414 at each node 410 can receive the transition instruction 432 and provide the transition instruction 432 to each core 412 of the node 410 to cause the nodes 410 to stop accepting traffic or connections 452 for the identified service 440.

The transition instruction 432 can include a command, instruction, script, task or any type and form of executable instructions to cause a master packet engine 414 of a node 410 to determine a client count value 428 for the node 410 and transmit the client count value 428 to the master node 410. For example, responsive to receiving the transition instruction 432, the master packet engine 414 of a node 410 can determine a client count value 428 for the node 410 and transmit the client count value 428 to the master node 410. The master packet engine 414 can store and maintain the client count value 428 at a storage device or database of the node 410. The master packet engine 414 can transmit an update to the client count value 428 or a second or subsequent client count value 428 for the node responsive to detecting the client count value 428 for the node 410 changed from a non-zero value to a zero value or from a zero value to a non-zero value. In some embodiments, the master packet engine 414 can transmit an update to the client count value 428 or a second or subsequent client count value 428 for the node 410 responsive to a change in the master node 410 for the cluster 402.

The master node 410 can generate an out of service instruction 434. The out of service instruction 434 can include a command, instruction, script, task or any type and form of executable instructions to cause or disable a service 440 in a cluster 402 and/or at each node 410 of the cluster 402. The master node 410 can generate the out of service instruction 434 responsive to determining that the client count value 428 for each node 410 is a zero value. The master node 410 can transmit or propagate the out of service instruction 434 to each node 410 of the cluster 402 and/or to each master packet engine 414 of each node 410 of the cluster 402. The out of service instruction 434 can identify the service 440 to be taken out of service and/or a time period indicating a length of time the respective service 440 will be disabled.

Client device 450 can include any form of a computing device described herein. For example, client device 450 can the same as client 102 or computing device 101 described above with respect to FIGS. 1A-1C. The client device 450 can connect with one or more nodes 410 of the cluster 402 and/or one or more cores 412 executing on the nodes 410 of the cluster 402 through one or more connections 452. For example, the client device 450 can establish a connection 452 to at least one node 410 and/or at least one core 412 to access a service 440 or the functionality of a service 440. The connections 452 can include a channel, connection or session between one or more nodes 410 and one or more client devices 450. In some embodiments, the connections 452 can include encrypted and/or secure connections 452 between a node 410 and a client device 450. For example, the connections 452 may include encrypted sessions and/or secure sessions established between a node 410 and a client device 450. The encrypted connections 452 can include encrypted files, data and/or traffic transmitted between a node 410 and a client device 450.

Each of the above-mentioned elements or entities is implemented in hardware, or a combination of hardware and software, in one or more embodiments. Each component of the nodes 410 may be implemented using hardware or a combination of hardware or software detailed above in connection with FIG. 4. For instance, each of these elements or entities can include any application, program, library, script, task, service, process or any type and form of executable instructions executing on hardware of a node 410. The hardware includes circuitry such as one or more processors in one or more embodiments. In some embodiments, the components of at least one node 410 may be implemented or include a non-transitory computer-readable medium that includes instructions that, when executed by a processor of the respective node 410 cause the processor to execute or perform the functionalities of the method 500.

Figure 5A:
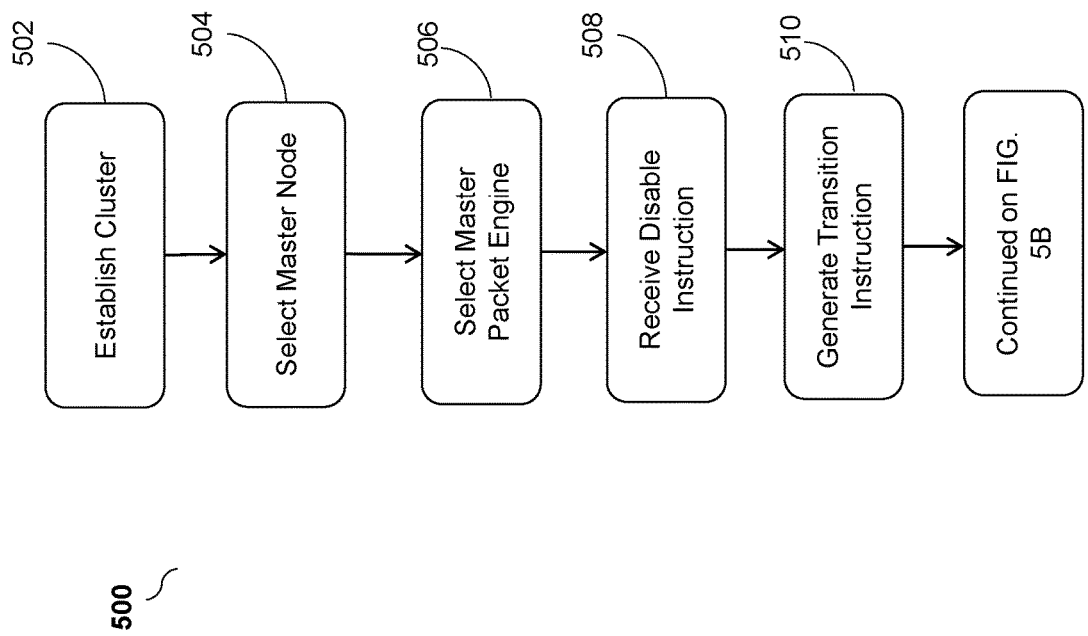
FIGS. 5A-5C include a flow chart illustrating a process or method for disabling services in a cluster, according to an example implementation of the present disclosure.
Figure 5B:
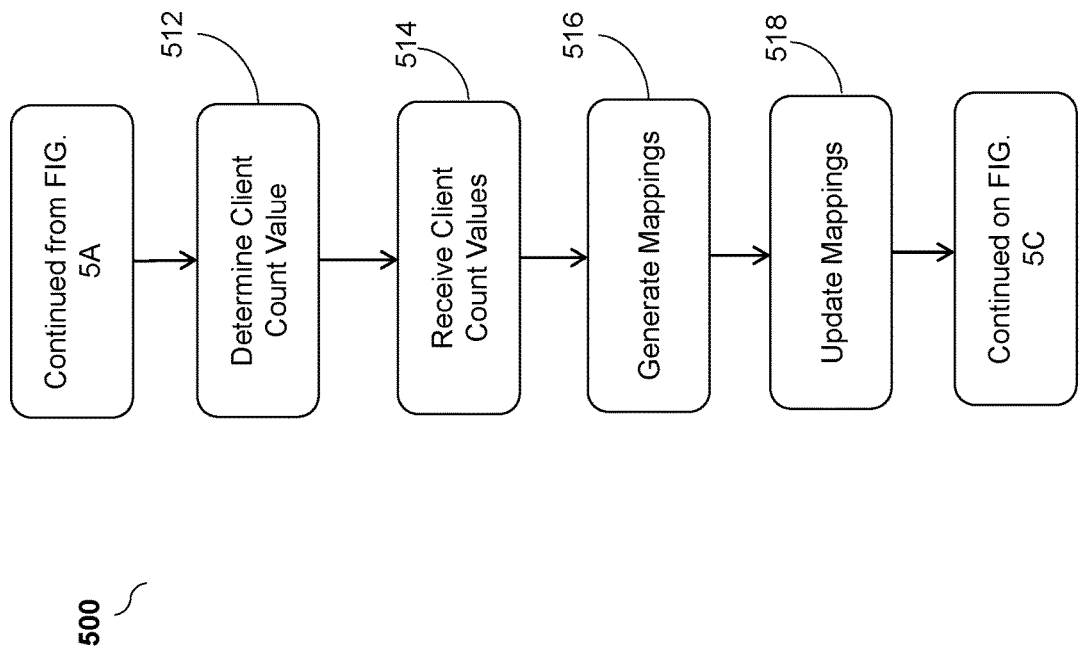
Figure 5C:
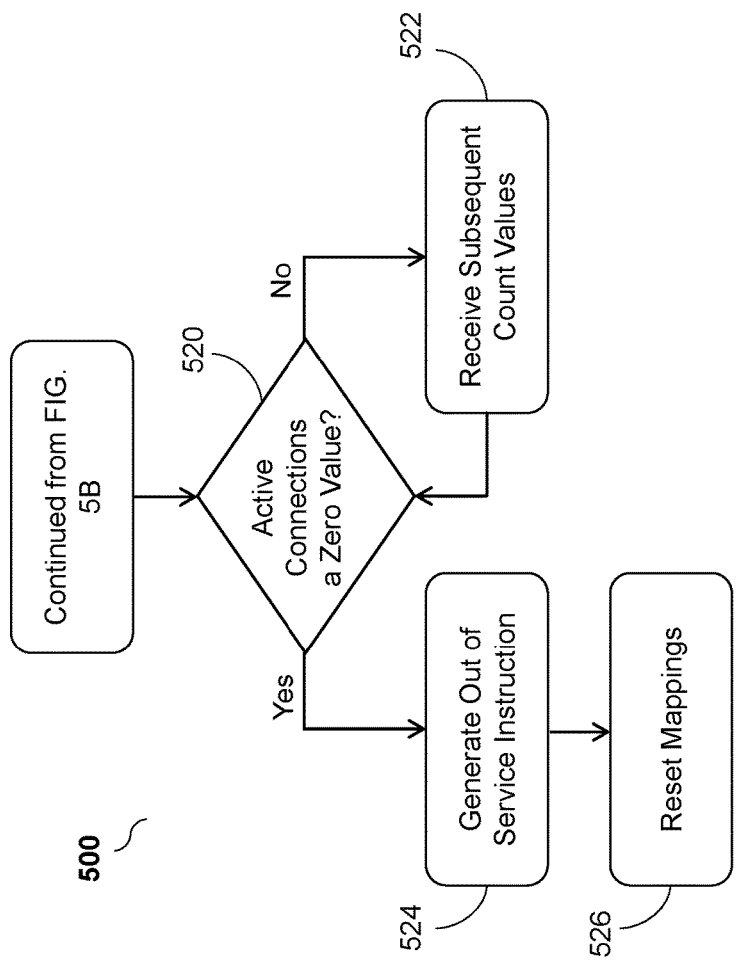

Referring now to FIG. 5, a method 500 for disabling a service 440 in a cluster 402 is depicted. In brief overview, the method 500 can include one or more of: establishing a cluster (502), selecting a master node (504), selecting a master packet engine (506), receiving a disable instruction (508), generating a transition instruction (510), determining a client count value (512), receiving client count values (514), generating mappings (516), updating mappings (518), determining a number of active connections (520), receiving subsequent count values (522), generating out of service instruction (524), and resetting mappings (526). Any of the foregoing operations may be performed by any one or more of the components or devices described herein, for example, the nodes 410 (e.g., master node 410) or master packet engines 414.

Referring to 502, and in some embodiments, a cluster 402 can be established. The cluster 402 can include a plurality of nodes 410 (e.g., application delivery controllers (ADCs)). The nodes 410 can include or correspond to appliances (e.g., application delivery controllers (ADCs). In embodiments, a plurality of nodes 410 can be grouped together to form the cluster 402. In some embodiments, the cluster 402 can be one cluster 402 of a plurality of clusters 402 forming a multi-cluster environment. Each of the nodes 410 can include one or more cores 412 and at least one packet engine 414 (e.g., master packet engine). In some embodiments, each of the cores 412 can include at least one packet engine 414.

Referring to 504, and in some embodiments, a node 410 can be selected as a master node 410. At least one node 410 of the cluster 402 can be selected or designated as a master node 410 or owner node. The remaining nodes 410 of the cluster 402 can be designated as non-owner nodes 410 or slave nodes 410. In some embodiments, the master node 410 can be selected based in part on a determined order (e.g., first node first, second node second). In embodiments, the master node 410 can be selected randomly. In some embodiments, an administrator of the cluster 402 can select or designate at least one node 410 as a master node 410. The master node 410 can remain as master node 410 until a change instruction is provided, for example, by an administrator of the cluster 402. In some embodiments, the master node 410 can remain as master node 410 for determined intervals or time periods. Each of the non-master nodes 410 in the cluster can be informed, instructed or made aware of which node 410 is the master node 410 through hashing or node to node communication. In some embodiments, the master node 410 can generate and transmit a master node instruction to each of the other nodes 410 or remaining nodes 410 in the cluster to indicate which node 410 is the master node 410. For example, the master node 410 can use consistent hashing or node to node messaging to inform or instruct the other nodes 410 or remaining nodes 410 that the sending node 410 is the master node 410.

Referring to 506, and in some embodiments, a packet engine 414 can be selected as a master packet engine 414. Each of the nodes 410 can select, assign or designate a packet engine 414 executing on the respective node 410 as a master packet engine 414 for the respective node 410. In some embodiments, the packet engine 414 for each node 410 can be designated as the master packet engine for the node 410 to determine, collect or retrieve information included, but not limited to, a client count value 428 indicating a number of active connections 452 from the one or more cores 412 of the respective node 410 to one or more client devices 450. In some embodiments, a packet engine 414 of at least one core 412 of the node 410 can be selected or designated as a master packet engine 414 for the respective node 410 and the remaining packet engines 414 of the other cores 412 of the respective node 410 can be designated as non-master or slave packet engines 414.

Referring to 508, and in some embodiments, a disable instruction 430 can be received. The master node 410 of the plurality of nodes 410 can receive a disable instruction 430 to disable a service 440, for example, to perform maintenance or upgrade the respective service 440. For example, the disable instruction 430 can be generated and transmitted by a control device or an administrator of the cluster 402. In some embodiments, the disable instruction 430 can be issued in predetermined time periods (e.g., monthly, bi-weekly) or based in part on a maintenance schedule for a service 440 or a plurality of services 440 provided by the cluster 402. In embodiments, the disable instruction 430 can be issued responsive to an issue with the service 440. For example, the disable instruction 430 can be issued responsive to an identification or complaint from a client device 450 regarding the service 440 or a node 410 regarding the service 440. The disable instruction 430 can identify at least one service 440 to be disabled or taken out of service. The disable instruction 430 can be transmitted to, executed on, or received at the master node 410 of the cluster 402. In some embodiments, the disable instruction 430 can skip or ignore the non-master nodes 410 or other nodes 410 of the cluster 402.

Referring to 510, and in some embodiments, a transition instruction (e.g., transition out of service (TROFS) command) can be generated. The master node 410 can generate at least one transition instruction 432 for each of the remaining nodes 410 of the cluster 402 to instruct or command the remaining nodes 410 to stop accepting traffic or requests from one or more client devices 450 to access or use a service 440. For example, the transition instruction 432 can be generated responsive to receiving the disable instruction 430 for the service 440 and the transition instruction 432 can identify the service 440 to be disabled or taken out of service.

In some embodiments, the master node 410 can change or modify a status of the service 440 from a first state to a second state, such as from an active state to a transition state responsive to receiving the disable instruction 430 for the service 440. After the status of the service 440 is changed, the master node 410 can generate the transition instruction 432 to alert or inform each of the remaining nodes 410 of the disable instruction 430 and the change of status of the service 440 in the cluster 402. The master node 410 can transmit, provide or propagate the transition instruction 432 to each of the remaining nodes 410 of the cluster 402 or other nodes 410 of the cluster to instruct the other nodes 410 to stop accepting requests or traffic from one or more client devices 450 for the service 440 or to stop establishing connections 452 to one or more client devices 450 for the service 440. The transition instruction 432 can include a node to node message or a connection meta message transmitted between two or more nodes 410. The transition instruction 432 can include a node identifier (e.g., entity identifier) for the intended recipient node 410 and a source node identifier indicating the node 410 (e.g., master node) transmitted the transition instruction 432.

Referring to 512, and in some embodiments, a client count value 428 can be determined. The non-master nodes 410 (e.g., non-owner nodes, other nodes, slave nodes 410) of the cluster 402 can receive the transition instruction 432 from the master node 410 and determine the client count value 428 for the respective node 410. In some embodiments, each of the nodes 410 can include or have a client count value 428 that indicates the number of active connections 452 to one or more client devices 450 from the respective node 410 for the service 440. For example, the connections 452 can be established from one or more cores 412 of a node 410 to one or more client devices 450. The master packet engine 414 on each node 410 can determine the number of active connections 452 for the respective node 410 and the cores 412 executing on the respective node 410. The master packet engine 414 can generate the client count value 428 to indicate if the number of client connections is a zero value (e.g., 0 connections) or a non-zero value (e.g., 1 connection, more than 1 connection). For example, in some embodiments, the master packet engine 414 can generate the client count value 428 to be a bit value of 0 to represent a zero value when there are no active connections 452 to any client devices 450 from the node 410 and/or from the cores 412 of the node 410. In some embodiments, the master packet engine 414 can generate the client count value 428 to be a bit value of 1 to represent a non-zero value when there is a single or multiple active connections 452 to one or more client devices 450 from the node 410 and/or from one or more cores 412 of the node 410. The client count value 428 can be a bit value or bit integer.

In some embodiments, responsive to receiving the transition instruction 432, the master packet engine 414 at each node can initiate or begin a timer function that can be executed at determined intervals (e.g., every 10 ms, 1 min) or time threshold. The time function can execute through each service 440 and/or service items provided by the respective node 410 that the master packet engine 414 is executing on. The master packet engine 414 can use or execute the timer function to detect or determine the client count value 428 for the node 410 at the determined intervals. For example, in some embodiments with the time function set at every 10 ms, the master packet engine 414 can determine the client count value 428 for the node 410 every 10 ms to detect any changes in the client count value 428 from a previous determination. In some embodiments, the master packet engine 414 can compare the time function to a current time (e.g., cur_time) to determine if the current time has exceed a time threshold represented by the time function. In embodiments, when the current time is greater than or exceeds the time function, the master packet engine 414 can set a flag of the node (e.g., service session initiated protocol (SIP) level flag) to indicate to send client count value (e.g., SEND_CUR_CLIENTS). In embodiments, the master packet engine 414 can transmit the client count value 428 to the master node 410.

The master packet engine 414 can propagate, provide or instruct each of the cores 412 of the node 410 to stop accepting requests or traffic from one or more client devices 450 for the service 440 or to stop establishing connections 452 to one or more client devices 450 for the service 440 responsive to receiving the transition instruction 432. In some embodiments, the master packet engine 414 can update or modify a flag of the node or at the cores of the node 410 to indicate to stop accepting traffic or requests for the service 440 indicated in the transition instruction 432. The master packet engine 414, responsive to receiving the transition instruction 432, can set a flag of the node (e.g., service session initiated protocol (SIP) level flag) to indicate to transmit the client count value (e.g., SEND_CUR_CLIENTS) to the master node 410. In embodiments, the master packet engine 414 can transmit the client count value 428 to the master node 410.

Referring to 514, and in some embodiments, the client count values 428 can be received. The master node 410 can receive from each of the other nodes 410 or remaining nodes 410 of the plurality of nodes 410 of the cluster 402, the client count value 428 indicative of a number of current client connections 450 from the one or more client devices 450 to a respective nodes 410 of the plurality of nodes 410. In embodiments, the master packet engine 414 can transmit the client count value 428 in a node to node message or a connection meta message. For example, the message can include the client count value 428 for the node, a node identifier (e.g., entity identifier) for the intended recipient node 410 (e.g., master node) and a source node identifier indicating the node 410 that the client count value 428 was provided from. In embodiments, the entity identifier can include or correspond to a unique number or identifier generated for each node 410 of the cluster 402.

Referring to 516, and in some embodiments, a first mapping 420 and a second mapping 424 can be generated. The master node 410 can generate a first mapping 420 (e.g., first bit map, availability bit map) that includes a bit value 422 for each node 410 of the cluster 402. The first mapping 420 can include at least one bit value 422, record or entry for each node 410 of the cluster 402. The first mapping 420 can map or indicate whether a node 410 of the cluster 402 has provided a client count value 428. In some embodiments, the client count values 428 can be provided, for example but not limited to, when the cluster 402 is established, when a master node 410 is selected, when a node 410 is added to the cluster, responsive to a transition instruction 432 or when the client count value 428 for a node 410 changes from a non-zero value to a zero value or from a zero value to a non-zero value. The master node 410 can set the bit value 422 for the node 410 in the first mapping 420 as a first bit value 422 (e.g., 0) if the respective node 410 has not provided a client count value 428. The master node 410 can set the bit value 422 for the node 410 in the first mapping 420 as a second bit value 422 (e.g., 1) if the respective node 410 has provided a client count value 428.

The master node 410 can generate a second mapping 424 (e.g., second bit map, client count bit map) that includes a bit value 426 for each node 410 of the cluster 402. The second mapping 424 can include at least one bit value 426, record or entry for each node 410 of the cluster 402. The second mapping 424 can indicate whether the count value 428 for a node 410 of the cluster 402 has a zero value (e.g., 0 active connections) or a non-zero value (e.g., 1 or more active connections). The master node 410 can set the bit value 426 for the node 410 in the second mapping 424 as a first bit value 426 (e.g., 0) if the client count value 428 of the respective node 410 is a zero value. The master node 410 can set the bit value 426 for the node 410 in the second mapping 424 as a second bit value 426 (e.g., 1) if the client count value 428 of the respective node 410 is a non-zero value.

Referring to 518, and in some embodiments, a first mapping 420 and a second mapping 424 can be updated. The master node 410 can receive one or more responses from the other nodes 410 or remaining nodes 410 in the cluster 402 in response to the transition instruction 432. The responses can include the client count value 428 for the respective node 410. For example, the responses can indicate whether the client count value 428 for the respective node 410 is a zero value or a non-zero value. The master node 410 can update the first and second mappings 420, 424 with the client count value information received from the nodes 410. For example, the master node 410 can update a bit value 422 of the first mapping 420 to indicate if the respective node 410 has responded with a client count value 428. In some embodiments, the master node 410 can change or modify the bit value 422 for a node 410 in the first mapping 420 from a first bit value 422 to a second bit value 422 if the node 410 has provided a client count value 428. The master node 410 maintain the bit value 422 for a node 410 in the first mapping 420 if the node 410 failed to provide or otherwise did not provide the client count value 428.

The master node 410 can update a bit value 426 of the second mapping 424 to indicate if the client count value 428 for the node 410 is a zero value or a non-zero value based on the response from the node 410. For example, the master node 410 can extract the client count value 428 from the response from the node 410 and change or modify the bit value 426 for the node 410 in the second mapping 424 from a first bit value 426 to a second bit value 426 if the client count value 428 for the node 410 has changed from a zero value to a non-zero value. The master node 410 can extract the client count value 428 from the response from the node 410 and change or modify the bit value 426 for the node 410 in the second mapping 424 from a second bit value 422 to a first bit value 422 if the client count value 428 for the node 410 has changed from a non-zero value to a zero value. In some embodiments, the master node 410 can maintain the bit value 426 for the node 410 in the second mapping 424 if the client count value 428 has not changed from a previous value or initial value (e.g., client count value still a zero value, client count value still a non-zero value).

Referring to 520, and in some embodiments, the master node 410 can determine the number of active connections 452. The master node 410 can use the bit value 426 in each entry of the second mapping 420 to determine whether the nodes 410 of the cluster 402 have a non-zero value or a zero value for their respective client count value 428 and thus indicate if the nodes 410 have any active connections 452 to client devices 450. For example, the master node 410 can search the second mapping 424 for entries having a second bit value 426 to determine if the active number of active connections 452 for the cluster 402 is a zero value.

The master node 410 can determine that the bit value 422 in one or more entries of the second mapping 424 include a second bit value (e.g., 1) indicating that the one or more nodes 410 have a non-zero value for their respective client count values 428. The non-zero value for the client count values 428 can indicate that the one or more nodes 410 have active connections 452 to one or more client devices 450. The method 500 can move to 522 and the master node 410 can wait to receive one or more next or subsequent client count values 428 or a next update to the client count values 428 for the one or more nodes 410.

In some embodiments, the master node 410 can determine that the bit value 422 in each of the entries of the second mapping 424 include a first bit value (e.g., 0) indicating that the each of the nodes 410 have a zero value for their respective client count values 428. The zero value for the client count values 428 can indicate that each of the nodes 410 have no active connections 452 to client devices 450. The method 500 can move to 524 and master node 410 can generate an out of service instruction 434. In some embodiments, the master node 410 can determine a total client count value 428 indicating the total number of active client connections 452 across all nodes 410 and cores 412 of the cluster by adding or combining the client count values 428 from each entry Referring to 522, and in some embodiments, the master node 410 can receive one or more subsequent client count values 428 updates. The master node 410 can wait for number of active connections 452 for the service 440 in the cluster 402 to become a zero value. In some embodiments, one or more nodes 410 can have active connections 452 to client devices 450 at the time the transition instruction 432 is issued by the master node 410. The master node 410 can wait or maintain the transition status for the service 440 until each of the active connections 452 at the one or more nodes 410 end, complete or disconnected.

For example, the master packet engine 414 at each node 410 can transmit an updated client count value 428 when the client count value 428 for the node 410 changes from a non-zero value to a zero value or from a zero value to a non-zero value. The master packet engine 414 can update a flag at the node to indicate the change in the client count value 428 for the node (e.g., SEND_CUR_CLIENT_NON-ZERO, SEND_CUR_CLIENT_ZERO) and transmit the subsequent client count value 428 to the master node 410. In some embodiments, the master packet engine 414 at each node 410 can transmit an updated client count value 428 in response to a change in ownership or a change in the master node 410 for the cluster 402. For example, the nodes 410 can receive an instruction indicating that the master node 410 for the cluster 402 has changed from the previous master node 410, new master node 410 or both the previous master node 410 and the new master node 410. The master packet engine 414 at each node 410 can transmit a current client count value 428 to the new master node 410.

In some embodiments, the master packet engine 414 can set a new timer function or reset the timer function on the node 410 responsive to transmitting a client count value 428 to the master node. For example, the master packet engine 414 can set the time function with a new time interval to check the client count value 428 or check for changes to the client count value 428 for the node 410. The master packet engine 414 can determine the client count value 428 at each interval of the time function and transmit a updated or subsequent client count value 428 to the master node 410 responsive to the client count value 428 changing from a non-zero value to a zero value or from a zero value to a non-zero value. In some embodiments, the master packet engine can update a flag at the node to indicate that the client count value 428 has been provided to the master node 410 (e.g., SEND_CUR_CLIENTS, SEND_CUR_CLIENTS_IN_PROGRESS).

The master packet engine 414 can receive an indication, callback or response from the master node 410 indicating that the client count value 428 for the node 410 was received at the master node 410. In embodiments, the master packet engine 414 can receive an indication, callback or response from the master node 410 indicating that the client count value 428 for the node 410 was not received at the master node 410 or an error occurred during transmission between the node 410 and the master node 410. In some embodiments, the master packet engine 414 can update the timer function after receiving the indication, callback or response from the master node 410. For example, the master packet engine 414 can update the timer function (e.g., increase the time, decrease the time) responsive to receiving an indication that the client count value 428 was received at the master node 410 or was not received at the master node 410. In some embodiments, the master packet engine 414 can increase the time value of the timer function to provide for more time to identify the issue that caused the message to fail and resolve the issue.

The master node 410 can receive the updated or subsequent client count values 428 can update the first mapping 420 and/or the second mapping 424. For example, the master node 410 can update the bit value 422 of the first mapping 420 to indicate that the respective node 410 has responded with a client count value 428. The master node 410 can change or modify the bit value 422 for a node 410 in the first mapping 420 from a first bit value 422 to a second bit value 422 if the node 410 has provided a client count value 428. The master node 410 can update the bit value 426 of the second mapping 424 to indicate the updated or subsequent client count value 428. The master node 410 can change or modify the bit value 426 for the node 410 in the second mapping 424 from a first bit value 426 to a second bit value 426 if the client count value 428 for the node 410 has changed from a zero value to a non-zero value. The master node 410 can change or modify the bit value 426 for the node 410 in the second mapping 424 from a second bit value 422 to a first bit value 422 if the client count value 428 for the node 410 has changed from a non-zero value to a zero value.

The master node 410 can determine if the number of active connections 452 for the cluster is a zero value. If the master node 410 determines that the bit value 422 in one or more entries of the second mapping 424 includes a second bit value (e.g., 1) indicating that the one or more nodes 410 have a non-zero value for their respective client count values 428, the method 500 can move to 522 and the master node 410 can wait to receive one or more next or subsequent client count values 428 or a next update to the client count values 428 for the one or more nodes 410. If the master node 410 determines that the bit value 422 in each of the entries of the second mapping 424 include a first bit value (e.g., 0) indicating that the each of the nodes 410 have a zero value for their respective client count values 428, the method 500 can move to 524 and master node 410 can generate an out of service instruction 434.

Referring to 524, and in some embodiments, the master node 410 can generate an out of service instruction 434. The master node 410, responsive to determining that each of the nodes 410 have a zero value for their client count values 428 and thus no active connections 452 from the nodes 410 to client devices 450 exist, can change or modify the status of the service 440 from transition to out of service. The master node 410 can generate an out of service (OFS) instruction 434 to instruct each of the nodes 410 of the cluster 402 that the service 440 is disabled or out of service, for example, for maintenance or upgrades. The master node 410 can transmit or propagate the OFS instruction 434 to each of the nodes 410 or other nodes 410 (e.g., slave nodes) of the cluster to disable the service 440 on the cluster 402. For example, the OFS instruction 434 can include the name or identifier for the service 440 and a command, script or instruction to disable access to the service 440 from the respective node 410. The OFS instruction 434 can include a node to node message or a connection meta message. The OFS instruction 434 can include a node identifier (e.g., entity identifier) for the intended recipient node 410 (e.g., non-master nodes), a source node identifier indicating the node 410 (e.g., master node) that transmitted the OFS instruction 434, identify the service 440 being disabled and/or a time value indication a length the service 440 will be out of service.

The master node 410 can change or modify a status of the service 440 from a second state to a third state, such as from the transition state to an out of service state. After the status of the service 440 is changed, the master node 410 can generate the OFS instruction 434 and transmit the OFS instruction 434 to each of the nodes 410 in the cluster 402. In some embodiments, when the service 440 is disabled, the nodes 410 are blocked or prevented from establishing a connection 452 to the service 440 or providing access to the service 440 (or functionality of the service) for client devices 450.

Referring to 526, and in some embodiments, the master node 410 can reset the first mapping 420 and the second mapping 424. The master node 410 can reset the first and second mappings 420, 424 after transmitting the OFS instruction 434 or after disabling the service 440. In some embodiments, the master node 410 can reset the first mapping 420 and the second mapping 424 after receiving the disable instruction 430. For example, the master node 410 can receive the disable instruction 430 and reset the first and second mappings 420, 424 prior to transmitting the OFS instruction 434 to the nodes 410 of the cluster 402.

The master node 410 can reset the bit value 422 in each entry of the first mapping 420. In some embodiments, the master node 410 can reset the bit value 422 in each entry of the first mapping 420 changing the bit value 422 from the second value to the first value to indicate that the respective nodes 410 have not yet provided client count values 428 after or subsequent to the transmission of the most recent OFS instruction 434 or most recent disabling of the service 440. In some embodiments, the master node 410 can maintain the bit value 422 in each entry of the first mapping 420 at the first value until a new or subsequent master node 410 is selected, responsive to a next or subsequent transition instruction 432 or when the client count value 428 for a node 410 changes from a non-zero value to a zero value or from a zero value to a non-zero value. In some embodiments, the master node 410 can reset the bit value 422 in each entry of the first mapping 420 by removing the bit value 422 included or set within each entry such that each entry has no value (e.g., no first value or second value) and maintain the first mapping 420 with no values entered until a new or subsequent master node 410 is selected, responsive to a next or subsequent transition instruction 432 or when the client count value 428 for a node 410 changes from a non-zero value to a zero value or from a zero value to a non-zero value.

The master node 410 can reset the bit value 426 in each entry of the second mapping 424. In some embodiments, the client count value 428 indicated in each entry of the second mapping 424 can include or be set at the first value to indicate a zero value and the master node 410 can maintain the bit value 426 in each entry of the second mapping 424 at the first value responsive to transmitting the OFS instruction 434 or disabling the service 440. In some embodiments, the master node 410 can reset the bit value 426 in each entry of the second mapping 424 by removing the bit value 426 included or set within each entry such that each entry has no value (e.g., no first value or second value) and maintain the second mapping 424 with no values entered until a new or subsequent master node 410 is selected, responsive to a next or subsequent transition instruction 432 or when the client count value 428 for a node 410 changes from a non-zero value to a zero value or from a zero value to a non-zero value.

In some embodiments, the master node 410 can disable a service 440 or take a service 440 out of service, for example, without client count value 428 information or a timer function. For example, the disable instruction 430 can be received or propagated to each node 410 of the cluster 402 including the master node 410 and the non-owner nodes 410. The disable instruction 430 can be received at but not executed on the non-owner nodes 410. The master node 410 can execute or act responsive to the disable instruction 430 and change the status of the service 440 to transition and propagate the status of the service 440 to the non-owner nodes 410 through a transition instruction 432. In some embodiments, the status of the service 440 can be moved from transition to out of service on the master node 410. The master node 410 can generate an out of service instruction 434 can propagate or transmit the out of service instruction 434 to each of the non-owner nodes 410 of the cluster. The status of the service 440 at each of the nodes 410 can change to out of service responsive to the out of service instruction 434 from the master node 410.

In some embodiments, the master node 410 can disable a service 440 or take a service 440 out of service using a timer function (e.g., timeout function). For example, the disable instruction 430 can be received or propagated to the master node 410 but skipped at the non-owner nodes 410 or not provided to the non-owner nodes 410. The disable instruction 430 can be received at but not executed on the non-owner nodes 410. The master node 410 can execute or act responsive to the disable instruction 430 and change the status of the service 440 to transition and propagate the status of the service 440 to the non-owner nodes 410 through a transition instruction 432. In some embodiments, the disable instruction 430 can include a timer function or time value and the status of the service 440 can be changed from transition to out of service after the timer function expires or is reached. For example, the status of the service 440 can be moved from transition to out of service on the master node 410. The master node 410 can generate an out of service instruction 434 can propagate or transmit the out of service instruction 434 to each of the non-owner nodes 410 of the cluster 402 after the timer function expires. The status of the service 440 at each of the nodes 410 can change to out of service responsive to the out of service instruction 434 from the master node 410.

In some embodiments, the master node 410 can be changed in the cluster 402. For example, a next or subsequent master node 410 can selected or assigned within the cluster and a master node instruction (e.g., change in ownership event (OVS)) can be issued within the cluster 402 to each of the nodes 410. The nodes 410 can receive the master node instruction can transmit or provide the client count value 428 to the new master node 410. In some embodiments, the previous master node 410 can transmit or provide the first mapping 420, the second mapping 424, and/or the count values 428 for each node 410 of the cluster 402 to the new master node 410.

In embodiments, a non-owner node 410 may not receive the master node instruction and may transmit subsequent client count values 428 to the previous master node 410 or incorrect master node 410. The previous master node 410 can transmit or provide the subsequent client count values 428 to the new master node 410. In some embodiments, the previous master node 410 may not receive the master node instruction and may not be aware that a new master node 410 is executing within the cluster 402. The previous master node 410 can receive subsequent client count values 428 and update the first mapping 420 and/or the second mapping 424 responsive to the one or more subsequent client count values 428. The previous master node 410 may transmit an out of service instruction 434 to each node 410 in the cluster 402, however the new master node 410 may not receive the out of service instruction 434. In such an embodiments, the new master node 410 can receive a disable instruction 430 and transmit a transition instruction 432 to each node 410 in the cluster 402 including the previous master node 410.

Thus, the non-owner nodes 410 can receive a transition instruction 432 and an out of service instruction 434 from different master nodes 410. In such an embodiment, the non-owner nodes 410 can process the transition instruction 432 from the new master node 410 and ignore or not act on the out of service instruction 434 from the previous master node 410. The previous master node 410 can receive the transition instruction 432 and detect that there is a new master node 410 in the cluster 402 and that a master node instruction was not received at the previous master node 410. The previous master node 410 can issue or transmit a failure instruction to the new master node 410 or a control device of the cluster 402. The new master node 410 or the controller of the cluster 402 can reissue the master node instruction to identify the new master node 410 to the previous master node 410. The new master node 410 or the controller of the cluster 402 can reissue the master node instruction to cause one or more flags at the previous master node 410 to be reset such that the status of the previous master node 410 changes to or indicates a non-owner node 410.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method for disabling a service in a cluster, the method comprising:
receiving, by a master node of a plurality of nodes of a cluster, a disable instruction for a service of the cluster, each node having a plurality of cores to provide one or more connections to one or more client devices using the service;
transmitting, by the master node to other nodes of the plurality of nodes, a transition instruction to instruct the other nodes to stop accepting requests from the one or more client devices for the service;
receiving, by the master node from each of the other nodes of the plurality of nodes, a client count value indicative of a number of current client connections from the one or more client devices to one or more respective nodes of the plurality of nodes; and
responsive to determining that the client count value is a zero value and there are no current client connections from the one or more client devices to one or more respective nodes of the plurality of nodes, transmitting, by the master node, an out of service instruction to each node of the plurality of nodes to disable the service on the cluster.

2. The method of claim 1, comprising:
generating, by the master node, the transition instruction for each node of the plurality of nodes to transition a status the service from active to transition at the plurality of nodes.

3. The method of claim 1, comprising:
determining, by a master packet engine for one or more nodes of the plurality of nodes, a client count value for the respective node changed from a non-zero value to the zero value or from the zero value to the non-zero value; and
transmitting, by the master packet engine for the one or more nodes, a subsequent client count value to the master node responsive to the change in the client count value.

4. The method of claim 1, comprising:
generating, by the master node, a mapping having a bit value for each node of the plurality of nodes, the bit value indicating if the respective node provided the client count value to the master node.

5. The method of claim 4, comprising:
updating, by the master node, one or more bit values in the first mapping to indicate that one or more nodes of the plurality of nodes provided respective count values.

6. The method of claim 5, comprising:
resetting, by the master node, the bit value in the mapping for each node responsive to transmitting the out of service instruction to the plurality of nodes.

7. The method of claim 1, comprising:
generating, by the master node, a mapping having a bit value for each node of the plurality of nodes, the bit value indicating if a client count value for the respective node has a non-zero value or a zero value; and
updating, by the master node, one or more bit values in the mapping to indicate a non-zero value or a zero value for the client count value for the one or more nodes of the plurality of nodes that provided respective count values.

8. The method of claim 7, comprising:
resetting, by the master node, the bit value in the mapping for each node responsive to transmitting the out of service instruction to the plurality of nodes.

9. The method of claim 1, comprising:
determining, by a master packet engine for each node, a client count value indicating a number of active connections to one or more clients from the node; and
transmitting, by the master packet engine for each node, the client count value to the master node responsive to the transition instruction.

10. A non-transitory computer readable medium storing instructions when executed by one or more processors cause the one or more processors to:
receive a disable instruction for a service of the cluster, each node having a plurality of cores to provide one or more connections to one or more client devices using the service;
transmit a transition instruction to instruct the other nodes to stop accepting requests from the one or more client devices for the service;
receive, from each of the other nodes of the plurality of nodes, a client count value indicative of a number of current client connections from the one or more client devices to one or more respective nodes of the plurality of nodes; and responsive to determining that the client count value is a zero value and there are no current client connections from the one or more client devices to one or more respective nodes of the plurality of nodes, transmit an out of service instruction to each node of the plurality of nodes to disable the service on the cluster.

11. The non-transitory computer readable medium of claim 10, further comprising instructions when executed by the one or more processors further cause the one or more processors to:

generate a first mapping having a bit value for each node of the plurality of nodes, the bit value indicating if the respective node provided a client count value to the master node; and generate a second mapping having a bit value for each node of the plurality of nodes, the bit value indicating if the client count value for the respective node has a non-zero value or a zero value.

12. A system comprising:

a master node of a plurality of nodes of a cluster, the master node comprising one or more processors configured to:

receive a disable instruction for a service of the cluster, each node having a plurality of cores to provide one or more connections to one or more client devices using the service;

transmit a transition instruction to instruct the other nodes to stop accepting requests from the one or more client devices for the service;

receive, from each of the other nodes of the plurality of nodes, a client count value indicative of a number of current client connections from the one or more client devices to one or more respective nodes of the plurality of nodes; and responsive to determining that the client count value is a zero value and there are no current client connections from the one or more client devices to one or more respective nodes of the plurality of nodes, transmit an out of service instruction to each node of the plurality of nodes to disable the service on the cluster.

13. The system of claim 12, wherein the one or more processors are further configured to generate the transition instruction for each node of the plurality of nodes to transition a status the service from active to transition at the plurality of nodes.

14. The system of claim 12, wherein the one or more processors are further configured to generate a mapping having a bit value for each node of the plurality of nodes, the bit value indicating if the respective node provided the client count value to the master node.

15. The system of claim 14, wherein the one or more processors are further configured to update one or more bit values in the mapping to indicate that one or more nodes of the plurality of nodes provided respective count values.

16. The system of claim 12, wherein the one or more processors are further configured to generate a mapping having a bit value for each node of the plurality of nodes, the bit value indicating if a client count value for the respective node has a non-zero value or a zero value.

17. The system of claim 16, wherein the one or more processors are further configured to update one or more bit values in the mapping to indicate a non-zero value or a zero value for the client count value for the one or more nodes of the plurality of nodes that provided respective count values.

18. The system of claim 17, wherein the one or more processors are further configured to reset the bit value in the mapping for each node responsive to transmitting the out of service instruction to the plurality of nodes.

* * * * *